M. LEITCH & S. H. HALL.
ADJUSTABLE CRANK.
APPLICATION FILED FEB. 25, 1914.

1,159,054.

Patented Nov. 2, 1915.

WITNESSES:
Rob't R. Kitchel
E. E. Wall

INVENTORS
Meredith Leitch and
Selden H. Hall
BY Frank J. Busser
ATTORNEY.

UNITED STATES PATENT OFFICE.

MEREDITH LEITCH AND SELDEN H. HALL, OF POUGHKEEPSIE, NEW YORK, ASSIGNORS TO THE DE LAVAL SEPARATOR COMPANY, A CORPORATION OF NEW JERSEY.

ADJUSTABLE CRANK.

1,159,054.   Specification of Letters Patent.   Patented Nov. 2, 1915.

Application filed February 25, 1914. Serial No. 820,862.

*To all whom it may concern:*

Be it known that we, MEREDITH LEITCH and SELDEN H. HALL, citizens of the United States, residing at Poughkeepsie, county of Dutchess, and State of New York, have invented a new and useful Improvement in Adjustable Cranks, of which the following is a full, clear, and exact description, reference being had to the accompanying drawings, which form a part of this specification.

In many machines operated by manual power, of which cream separators are one class, there is a large inertia making the start hard and yet after reaching full speed these machines run with little power. If a long crank is used on such a machine the effort needed to start it is much less than with a short one, but after reaching full speed the exertion of moving the body to swing the large circle is more tiring than the work needed to drive the machine. The existence of these two opposed conditions has resulted in the use of a compromise length of crank that is too short for easy starting and yet is too long for easy operation after full speed has been attained.

The object of this invention is to provide a crank that may be adjusted to fit either of the above mentioned conditions.

A second object is to provide a crank that may be changed from the length for one condition to the length for the other condition without stopping the machine.

A third object is to provide automatic means for locking it at either position while it is being used.

A fourth object is to provide automatic means to release the lock when the application of power to the crank ceases.

In the preferred embodiment of our invention we make use of a hub fastened to the shaft to be driven and on this hub provide a center not the center of the shaft about which the crank may be rotated independent of the rotation of the shaft. In this hub we provide a dog that is adapted to engage one or the other of two ratchet teeth on the crank member; said teeth being so placed that with one of them in engagement with the dog the crank is on the side of its center away from the crank shaft center, while with the other tooth engaged with the dog the crank is on the side of its center nearest to the center of the shaft.

Figure 1:
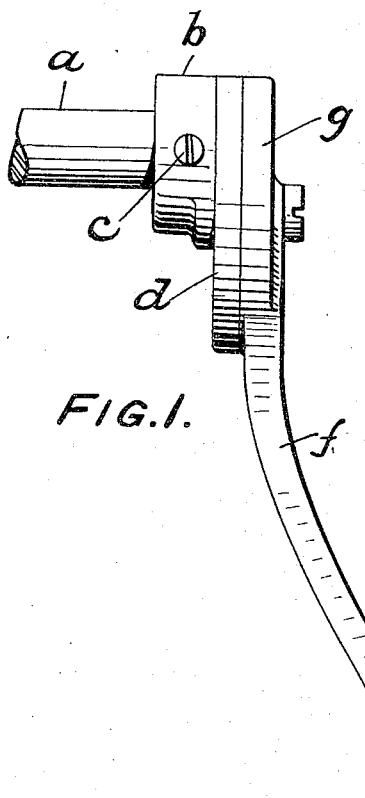
Figure 2:
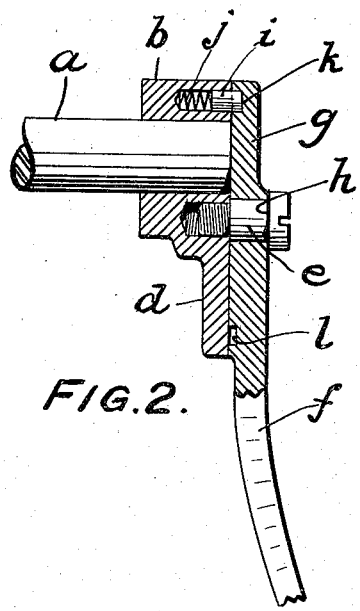
Figure 3:
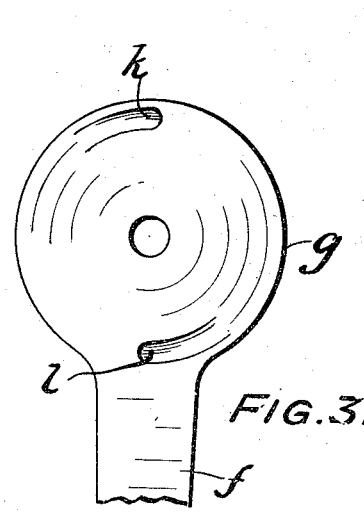
Figure 4:
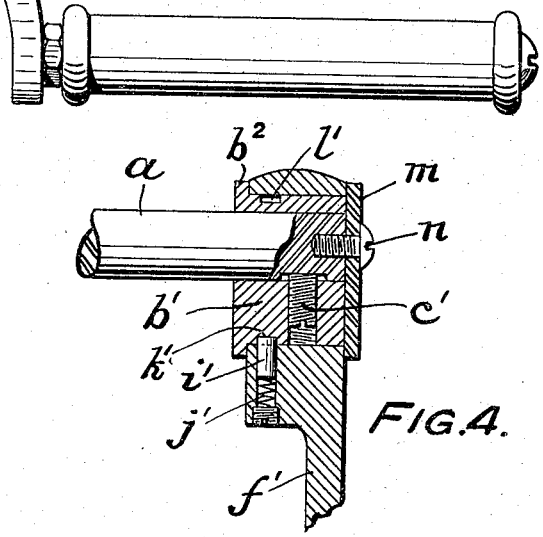

In the drawings: Figure 1 is a side view of a crank embodying our invention. Fig. 2 is a sectional view on the center line of the crank shaft. Fig. 3 is a view of the side of the crank member nearest to the driven machine. Fig. 4 is a sectional view similar to Fig. 2 showing an alternative construction embodying the same principles as those shown in the other figures.

*a* is a shaft to be driven by the crank.

*b* is a hub fastened to the shaft *a* by a set screw *c* and having a disk *d* the center of which does not coincide with the center of the shaft.

*e* is a bearing, with its center coinciding with the center of the disk *d*, about which the crank may rotate.

*f* is the crank arm having a disk *g* adapted to fit over the bearing *e* and against the disk *d*.

*h* is a shoulder on the bearing and holds the disk *g* against the disk *d*.

*i* is a dog or pin forced outward by the spring *j* from a socket in the hub *b*.

At *k* and *l* are ratchet teeth in the disk *g*. These teeth are so shaped as to allow a free movement of the crank backward relative to the shaft but to engage the dog and prevent forward movement.

The operation is as follows: The operator turns the crank arm backward, relative to the shaft, until the crank center (*i. e.*, center of the bearing *e*) is between the shaft center and the free end of the arm. The dog *i* will then engage the ratchet tooth *k* and turning the crank forward will start the machine with a long crank arm. After the desired speed has been reached the operator holds the crank stationary while the shaft makes one half revolution. Notice of the completion of the half turn will be given by the click of the dog *i* entering the ratchet tooth *l*. The shaft center is now between the crank center, or center of bearing *e*, and the free end of the crank arm, affording a relatively short arm, and the machine may be driven in this way as long as it is desired to do so.

In the modification shown in Fig. 4, the hub *b'* is eccentrically shaped and is secured to the shaft $a$ by means of a set screw $c'$. The hub is provided at one end with a circumferential flange $b^2$, and against the other end of the hub and the end of the shaft, which are flush one with another, is applied a disk or plate $m$, which is secured to the shaft by means of the axially-extending set screw $n$. The plate $m$ corresponds in area with the flanged end of the hub, thus affording a groove for the reception of the orificed neck at the fulcrumed end of the crank arm $f'$, which, of course, in assembling, is positioned on the hub before the application of the plate $m$. A dog or pin $i'$ extends into a socket in the neck of the crank arm $f$ and is forced outward by a spring $j'$. At $k'$ and $l'$ are ratchet teeth in the hub adapted to engage the dog $i'$ and prevent forward movement of the crank relative to the shaft. One of these teeth $l'$, is located in that part of the periphery of the hub nearest the center of the shaft while the other tooth $k'$ is located in that part of the periphery of the hub farthest from the center of the shaft.

The operator turns the crank arm backward, relative to the shaft, until the dog $i'$ enters the ratchet tooth $k'$. Turning the crank forward will start the machine with a long crank. After the desired speed has been reached the operator holds the crank stationary while the shaft makes one half revolution, when the dog $i$ enters the ratchet tooth $l'$. The crank is now in position for a short arm.

The difference in length between the long and the short crank of the construction of Figs. 1, 2 and 3 may readily be seen to equal twice the distance between the center of the shaft $a$ and the center of the bearing $e$. In the construction of Figs. 4 and 5, the difference in length between the long and the short crank will equal the difference between the shortest and the longest radius of the hub, or twice the distance between the center of the shaft and the axis of the crank. In both constructions, the crank, when not in driving engagement with the hub and shaft, is turnable, independently of the shaft and relatively to the hub, about a center not the axis of the shaft; and the teeth are so placed that when one of them is in engagement with the dog the crank is on the side of its center away from the shaft center and therefore affords a long crank arm, while with the other tooth engaged with the dog the crank is on the side of its center nearest to the shaft center and therefore affords a short crank arm.

Having now fully described our invention what we claim and desire to protect by Letters Patent is:

1. An adjustable crank construction comprising a crank shaft, a crank arm turnable freely in one direction independently of the shaft and also movable relative to the shaft to vary the distance between the shaft and the free end of the crank arm, and locking connections between the shaft and crank arm adapted to maintain the crank arm in fixed relation to the shaft in either of its relative positions in the turning movement of the crank arm in the opposite direction.

2. An adjustable crank construction comprising a crank shaft, a crank arm, turnable independently of the shaft on an axis not coincident with the axis of the shaft, and means to hold the crank arm in fixed driving relation to the shaft in a plurality of positions of the crank arm about the first-named axis.

3. An adjustable crank construction comprising a crank shaft, a crank arm, rotatable in one direction independently of the shaft on an axis independent of the axis of the shaft, thereby effecting the reversal of the positions of the two axes relative to the free end of the crank arm, and interlocking means adapted to hold the shaft in fixed relation to the crank arm in the rotation of the latter in the opposite direction to enable the shaft to be driven by the crank arm.

4. An adjustable crank construction comprising a driven crank shaft, a hub attached to said shaft, a driving crank arm rotatively attached to said hub, the center of rotation not coinciding with the center of the crank shaft, and a dog and ratchet teeth, one turning with the shaft and the other with the crank arm, adapted to lock the crank arm to the hub in either of two positions, these positions being adapted to produce one a long and the other a short stroke of the crank.

5. An adjustable crank construction comprising a driven crank shaft, a hub attached to said shaft, a driving crank arm rotatable on the hub on an axis not coincident with the center of the crank shaft, and means to lock the crank arm to the hub when the crank arm is turned to bring nearest its free end either its own axis or the axis of the shaft.

6. An adjustable crank construction comprising a driven crank shaft, a hub attached to said shaft, a driving crank arm rotatable on said hub on an axis not coincident with the center of the crank shaft, and complementary locking devices on the hub and crank arm arranged to position the crank arm fixedly relative to the shaft at different positions of the crank arm about its axis on the hub.

7. An adjustable crank construction comprising a crank shaft, a hub attached to said shaft, a crank arm freely rotatable backwardly on said hub on an axis not coincident with the center of the crank shaft, and means to arrest the forward motion of the crank arm about its axis on the hub at a plurality of positions corresponding to different radii from such axis of rotation, thereby causing the crank arm, when thus arrested at different positions, to drive the shaft with leverages of varying length.

8. An adjustable crank construction comprising a driven crank shaft, a hub attached to said shaft, a driving crank arm freely rotatable backwardly on the hub on an axis not coincident with the center of the crank shaft, and locking means adapted, in the forward turning movement of the crank arm, to lock the hub to the arm at different distances from the free end of the latter.

9. An adjustable crank construction comprising a driven crank shaft, a driving crank arm freely revoluble in one direction independently of the shaft and also movable relatively to the shaft to vary the distance between the shaft and the free end of the crank arm to provide a relative long or short effective length of crank arm, and means to maintain the crank arm when in either position in fixed relation to the shaft in the turning movement of the crank arm in the opposite direction.

10. An adjustable crank construction comprising a driven crank shaft, a driving crank arm, turnable independently of the shaft on an axis not coincident with the axis of the shaft, and means to lock the crank arm from rotation in one direction relative to the shaft in a plurality of positions of the crank arm about the first named axis, thereby permitting the crank arm to turn about the axis of the shaft and drive the same.

11. An adjustable crank construction comprising a driven crank shaft, a driving crank arm freely rotatable in one direction independent of the shaft on an axis independent of the axis of the shaft thereby effecting the reversal of the positions of the two axes relative to the free end of the crank arm, and interlocking means adapted to hold the shaft in fixed relation to the crank arm in the rotation of the latter in the opposite direction.

12. An adjustable crank construction comprising a crank shaft, a crank arm movable relatively to the shaft to vary the distance between the axis of the shaft and the free end of the crank arm, and a plurality of locking connections between the crank arm and shaft corresponding to the several adjustable positions of the crank arm and each adapted to be rendered inoperative when the crank arm is held from rotation with the shaft.

In testimony of which invention, we have hereunto set our hands, at Poughkeepsie, on this 21 day of February, 1914.

MEREDITH LEITCH.
SELDEN H. HALL.

Witnesses:
CHARLES L. POWELL,
H. C. BECKMAN.

Copies of this patent may be obtained for five cents each, by addressing the "Commissioner of Patents, Washington, D. C."